United States Patent [19]

Browning

[11] Patent Number: 4,762,977
[45] Date of Patent: Aug. 9, 1988

[54] DOUBLE ARC PREVENTION FOR A TRANSFERRED-ARC FLAME SPRAY SYSTEM

[76] Inventor: James A. Browning, P.O. Box 6, Hanover, N.H. 03755

[21] Appl. No.: 38,569

[22] Filed: Apr. 15, 1987

[51] Int. Cl.$^4$ .............................................. B23K 9/00
[52] U.S. Cl. ........................... 219/121.47; 219/76.16; 219/121.53; 219/121.51; 219/121.52
[58] Field of Search ................. 219/121 PR, 121 PM, 219/121 PS, 76.16, 121 PL, 75, 74, 121 PY; 313/231.31, 231.41, 231.51

[56] References Cited

U.S. PATENT DOCUMENTS

| | | | |
|---|---|---|---|
| 3,312,566 | 4/1967 | Winzeler et al. | 219/121 PS |
| 4,095,081 | 6/1978 | Ashman | 219/76.16 |
| 4,136,273 | 1/1979 | Eujita et al. | 219/76.16 |
| 4,370,538 | 1/1983 | Browning | 219/121 PL |

Primary Examiner—M. H. Paschall
Attorney, Agent, or Firm—Sughrue, Mion, Zinn, Macpeak & Seas

[57] ABSTRACT

A method and apparatus for reliable flame spraying utilizes a transferred arc from a plasma torch as created between the cathode electrode coaxial with the plasma torch nozzle and the end of at least one wire or rod fed into the transferred arc axially beyond the exit of said plasma torch nozzle. A high velocity annular gaseous sheath is formed concentrically about the extended arc column to form an arc column guide to restrict the arc column to within a region closely spaced radially from the axial extension of the nozzle. A thin walled tube close to but radially outside of the arc column is affixed to but may be electrically insulated from the plasma torch body forming the torch nozzle. Gas flow is effected along at least the outer surface of the tube in the direction of the extended arc column such that the arc column cannot penetrate the sheath high velocity gas to cause the arc to extinguish itself when the wire or rod is withdrawn from the arc column region. Inner and outer flows may be used, of differing gas types. A secondary arc may be set up between the ends of two wires or rods being fed into the arc region and operated in parallel with primary transferred arc.

24 Claims, 2 Drawing Sheets

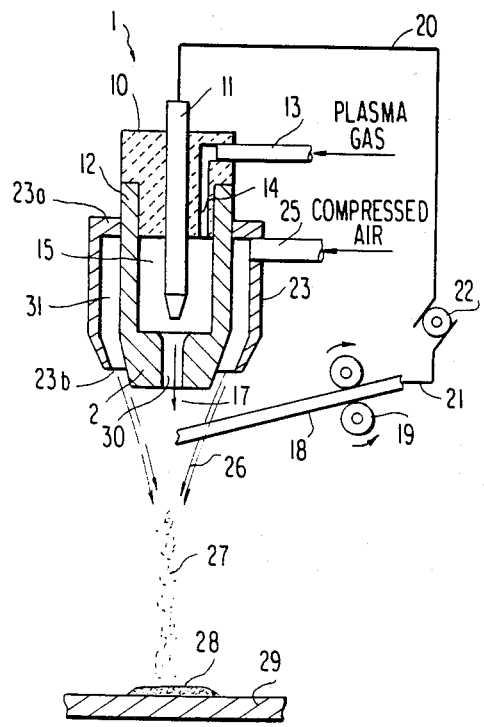
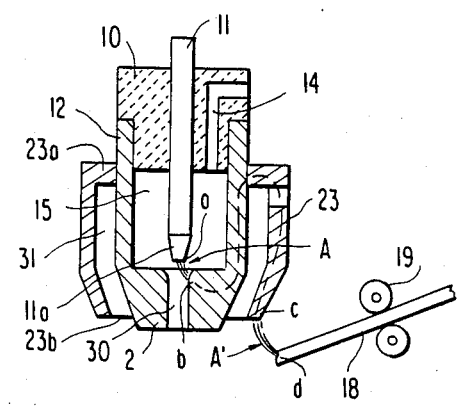
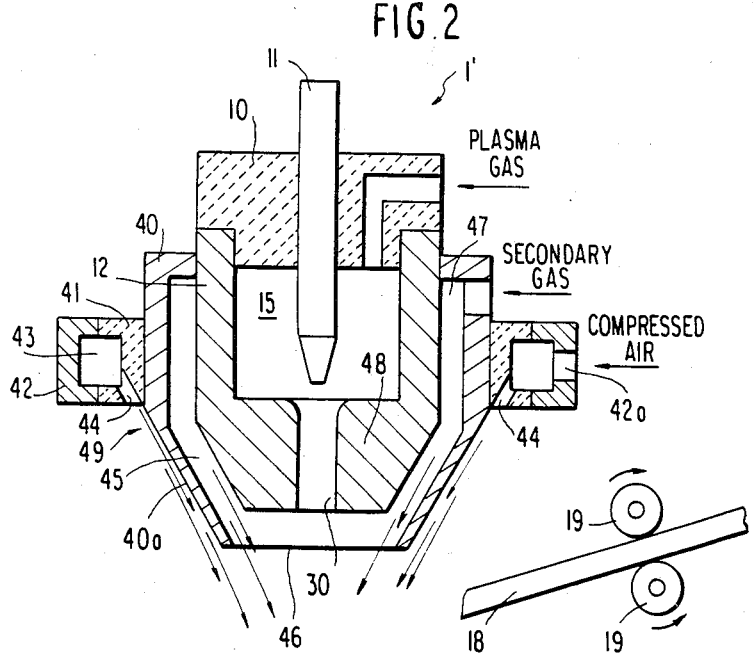
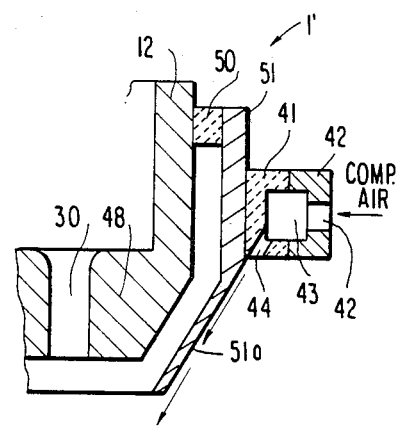

DOUBLE ARC PREVENTION FOR A TRANSFERRED-ARC FLAME SPRAY SYSTEM

FIELD OF THE INVENTION

This invention relates to flame spray systems, and more particularly to a transferred plasma-arc flame spray system which eliminates double arcing due to improper material feed.

BACKGROUND OF THE INVENTION

In the practical use of the transferred plasma-arc flame spray systems for spraying of electrically conductive wires and rods, major problems confront the process. The equipment requirements of transferred plasma-arc spraying of electrically conductive wires and rods are similar to those used for plasma cutting of metal. In place of a metal to be cut, a wire, rod or strip of metal is fed into the transferred arc for melting and atomizing the metal. A large secondary flow of compressed air further atomizes the molten particles and accelerates them to high velocity for impaction against the surface to be spray-coated. FIGS. 1A and 1B illustrate a typical transfer of plasma-arc flame spray system, and the double arcing action, due to a stop-page of feed of the metal material. In FIG. 1A, the transferred plasma-arc flame spray system of the prior art takes the form of a transferred plasma-arc torch 1, comprised of three major elements. An electrode 11 is mounted coaxially within an electrically insulating piece 10 at one end of a cylindrical metal body 12, the opposite end of the body 12 is closed off by an end wall 2, provided with an axial bore forming a nozzle 30. The electrode 11 is coaxial with the nozzle passage or bore, and within an annular chamber 15. A plasma forming gas is introduced through a tube 13, and a formed passage 14 within the insulating piece 10 to chamber 15, where the plasma forming gas passes into and through nozzle 30. Concentrically surrounding the body 12 is a cup-shaped member 23, forming an annular space 31 between the cup-shaped member 23 and the cylindrical body 12. One end of the cup-shaped body 23 is closed off by end wall 23a, while its opposite end 23b is open. A tube 25 provides and feeds compressed air into the annular space 31 for discharge through the open end of the cup-shape member 23, which functions to atomize the metal fed into the plasma-arc, and accelerates those particles in the direction of the workpiece or substrate 29. The metal to be flame sprayed onto the surface of the substrate 29, is shown in the form of a wire or rod 18, which is fed into a developed arc column 17, by powered rolls 19 which rotate in the direction of the arrows to feed the wire 18 from right to left FIG. 1A. An electrical, potential difference is developed between the wire 18 which acts as one as the anode, and the cathode electrode 11 from a DC electrical source such as generator 22 via leads 20, 21 coupled respectively to the cathode electrode 11 and the anode wire 18.

In operation, the arc column 17 is positioned centrally through the nozzle 30 to strike the anode, in this case, wire 18 fed by powered rolls 19. The gas flow, (particularly where it has sufficient tangential whirling component to cause vortex flow through the nozzle 30) positions the arc column 17 essentially within the nozzle 30, well away from the nozzle wall. The compressed air which causes additional atomizing and particle acceleration of particles 27, passes from the annular space 31 through a conical discharge passage 24, exiting the annular opening 23b of member 23 as an annular, conical, high velocity air-flow or stream 26 thereby accelerating the molten particles 27 to form coating 28 on the workpiece or substrate 29.

As long as the end of wire 18 remains in line with nozzle 30, performance remains stable. High melt-off rates are possible at reasonable costs. To remain in-line with nozzle 30, the wire 18 must be fed steadily at high rates. Malfunction of the power feed system, schematically illustrated by the powered rolls 19, a kink in the wire 18, or inadvertent shut-off of the wire feed, can result in serious damage due to the phenomena of "double arcing".

FIG. 1B illustrates a double arcing action due to the stoppage of wire 18. Assuming that the mechanical feed system exemplified by powered rolls 19 has been shut-off, the stable operation of FIG. 1A will keep the arc column passing through nozzle 30 to strike and melt the receding end of wire 18. The arc column obviously must bend to the right, and within nozzle 30 it soon approaches and contacts the nozzle wall of the cup-like member 23 adjacent its open end 23b. As soon as this happens, an alternate electrical path of lower voltage becomes available to the electrical source 22. This path, is set up between the tip 11a of the cathode electrode 11, at a, the edge of cylindrical body end wall 2 at the nozzle 30 proximate to the electrode tip 11a, at b, through the cylindrical metal body 12, the cup-shaped member 23, the edge of the cup-shaped member 23 adjacent opening 23b, at c and the receding end d of metal wire 18 forming the anode electrode. The path a-b-c-d, establishes two low voltage arcs A and A' FIG. 1B, between the points a, b, and c, d respectively, with the current passing through the low resistance path of metal cylinder 12 and cup-shaped member 23 respectively. The metal at points b and c is rapidly eroded away, often leading to complete destruction of the plasma torch 1.

It is therefore a primary object of the present invention to provide an improved transferred plasma-arc flame spray system which eliminates double arcing.

It is a further object of the present invention to provide an improved transferred plasma-arc flame spray system in which both a powder and wire may be fed into the struck arc, wherein, the wire of particles strike the workpiece or substrate in a molten state, while the particles introduced in powder form are in a heat softened state at the moment of impact with the substrate.

It is a further object of the present invention to provide an improved transferred plasma-arc flame spray system which advantageously utilizes a secondary arc created between a primary metal wire fed into the arc flame for melting, and particle application to the substrate in a secondary wire fed thereto to materially increase the spray rate of molten particles applied to the substrate.

SUMMARY OF THE INVENTION

The present invention is directed to a method and apparatus for reliable flame spraying of material in particle form from one, or more wires or rods using the transferred arc from a plasma torch where the wire or rod is fed into the arc extending axially beyond the exit of a plasma torch nozzle and restricting the arc column to within a region closely spaced radially from the axial extension of the nozzle by containing that region via a high velocity annular gaseous sheath passing around the arc column and thereby forming an arc column guide. As such, the arc column cannot penetrate the sheath of high velocity gas to automatically cause the arc to extinguish itself when the wire or rod is withdrawn from the region whose boundaries are defined by the high velocity annular gas sheath. A thin-wall tube concentrically surrounds the cylindrical torch body, but is axially remote from arc column, to effect a first gas flow along the inner surface of the tube as an accelerating gas stream for the molten particles emanating from the wire or rod at the end thereof intersecting the arc column. Means are provided for creating a second gas flow along the inner surface of said tube at a velocity which is sufficiently high and whose volume is sufficiently high to prevent the arc column from deflecting radially through said first and second gas flows. As such that the inner and outer flows of gas combine to restrict the arc column to a nearly axial path. The inner and outer flow may be of different gas types. Two, three or more wires or rods may be fed into the axial plasma gas stream to produce the axial arc column and to maintain said arc column coaxial with the nozzle of the plasma torch. One or more of the wires may form the ground connection of the electrical circuit which further includes a DC electrical source connected at its opposite side to the plasma torch cathode electrode, to form a primary transferred arc axially aligned with the plasma torch nozzle. A low voltage secondary arc may be imposed between two of the wires or rods being fed into the arc region with the primary transferred arc operating in parallel with said secondary arc. A non-electrically conductive material of the class represented by illuminance may be arc sprayed with the non-electrically conducting material constituting a core of wire having a thin outer sheath of conducting metal. The outer conducting sheath may be the unoxidized metal of an oxide powder constituting the core. The inner flow of the arc column guide may be a flow of pure oxygen which reacts with the molten particles produced from the outer sheath portion of the wire or rod to form the oxide of that metal. The means for effecting the outer gaseous flow of the arc column guide constituting said outer tube, is electrically isolated from the metal cylindrical body of the plasma torch forming said plasma torch and nozzle, and wherein, said means for effecting a high velocity gas flow along the outer surface of said tube may comprise a hollow annular member surrounding said outer tube, being fixed thereto, and a plurality of circumferentially spaced discharge ports or orifices within said annular body, aligned with the outer surface of said tube. Means supply a gas under pressure to said annular chamber within said annular body for discharge through said orifices. In addition to the feeding of one or more wires or rods into the arc region extending axially beyond the exit of said plasma torch body nozzle, one or more flows of a powder material to be sprayed may be introduced into said region. Further, instead of the material being fed in wire or rod form, the material to be flame sprayed may constitute one or more strips of metal to offer a relatively large anode surface to the transferred arc to increase the rate of the material deposit on the substrate.

BRIEF DESCRIPTION OF THE DRAWINGS

FIGS. 1A and 1B are a partial schematic, partial vertical sectional views of a conventional transferred plasma-arc spray system showing the development of a double arc under certain conditions of system operation which may result in the destruction of plasma-arc torch.

FIG. 2 is a vertical sectional view of a transferred plasma-arc torch for such a system forming a preferred embodiment of the present invention.

FIG. 3 is a vertical sectional view of a portion of an alternative plasma-arc torch design of a transferred plasma-arc torch design forming a second embodiment of the present invention.

DESCRIPTION OF THE PREFERRED EMBDIMENTS

Figure 4:
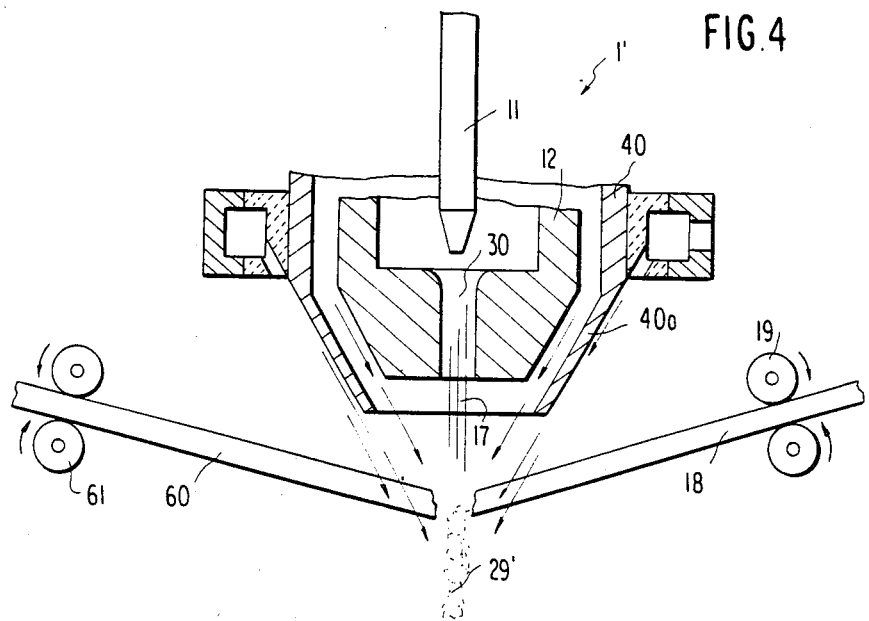
FIG. 4 is a vertical sectional view of a portion of a transferred plasma-arc torch forming another embodiment of the invention.

The present invention is directed to improvements wherein the transferred plasma-arc torch for a transferred plasma-arc flame spray system which eliminates the double arcing phenomena experienced as a result of failure to feed a metal wire, rod or strip of metal towards the axis of the nozzle of the torch body nozzle, where the metal wire, rod or strip functions as the anode electrode of the transferred plasma-arc torch. In the embodiments of FIGS. 2-6, like elements to the elements illustrated in FIGS. 1A, 1B of prior art torch bear similar numerical designation in the description of the elements and their function, where identical, are not repeated and the description of the various embodiments for simplification purposes. In the absence of such description, the structure and components illustrated having correspondence in FIGS. 2-6 to the prior art FIG. 1A, FIG. 1B are presumed to be identical in structure and function.

In the first embodiment of the invention illustrated in FIG. 2, the torch body 15 is similarly composed of a cylindrical metal body 12 closed off at one end by an electrically insulating piece 10 while its opposite end includes an axial bore defining a nozzle 30 whose passage is coaxial with the cathode electrode 10 projecting into and partially defining, the annular chamber 15 through which the plasma gas pass as indicated by the arrow. The cup-shaped metal member or a piece 40 which is similar to the cup-shaped member 23 of FIG. 1A, terminates in a conical portion 40a whose open end forms a circular opening 46 which is shown to be axially beyond the exit of nozzle 30 of cylindrical body 12. In some cases the open end may be slightly before the exit of nozzle 30, or even to it. A secondary gas, fed as indicated by the arrow, enters the end space 47 between the cup-shaped metal body 40 and the metal cylindrical body of the torch 1'. Further, the cylindrical body 12 at end wall 48 has its outer periphery tapered into a frusto-conical form tending to match the frusto-conical portion 40a of the cup-shaped member 40, thereby defining an annular, conical reducing section 45. The metal cup-shaped member 40 constitutes a guide piece, which is one element of an arc column guide indicated generally at 49. An annular ceramic piece 41 of C-shaped cross section and of nearly infinite electrical resistance is fixedly mounted to the outer periphery of the cup-shaped body 40 and in turn, a second annular shell piece 42 of reverse C-shaped configuration is fixedly mounted to the ceramic piece 41, is sealed thereto at the confronting edges, and is dimensionally sized so as to define an annular gas distribution passage or chamber 43. A series of circumferentially spaced holes or orifices 44 are formed within the ceramic piece 41 having axes aligned with the outer surface of the frusto-conical portion 40A of the cup-shaped member 40. Compressed air as indicated by the arrow, is fed through a port 42a within the shell piece 42 to pressurize the annular distribution passage or chamber 43. A high velocity flow of compressed air (as a tertiary gas) exits from the orifices 44 to pass over the outer surface of the guide piece 40. Secondary gas exits from the annular chamber 47 through the conical reducing section 45 through the opening 46 within the end of member 40. Assuming conditions of operation similar to the prior art apparatus of FIG. 1A with an arc column established between the cathode electrode 11 and the tip end of wire 18 and with wire feed occurring in the manner described in FIG. 1A, if for some reason the wire drive via powered rolls 19 is shut off, the arc column tends to follow the initial receding end face of wire 18 until the wire passes outside of the high velocity gas sheath comprised of the combined secondary and cursory gas flows as indicated by the arrow over the outside of the frusto-conical portion 40a of member 40 and along the inner surface of that same member. The arc is prevented from passing to the inner face of guide 40 by the combined secondary and tertiary flows. Rather, it is "blown" by the combined gas flow outward and away from the wire 18. When the maximum voltage output of the supply 22 of the supply (corresponding to supply 22, FIG. 1A) is reached, the arc extinguishes. FIG. 2 illustrates a preferred embodiment of the invention in which the guide piece 40 is permitted to have a metal (electrically conducting) connection to the metal torch body 12.

Turning to FIG. 3, in an alternate embodiment of the invention, an electrically insulating annular ring or piece 50 is interposed between the metal torch body cylinder 12 and guide piece 51 which in all other respects is like guide piece 40 of the embodiment of FIG. 2. In the enlarged view of FIG. 3, the annular ceramic piece 41 and its mirror image and its annular shell piece 42 are clearly seen as being physically joined together to define chamber 43, with the ceramic piece 41 being affixed to the outer periphery of the cylindrical portion of the guide 51. In this embodiment, instead of having a secondary gas flow along the internal surface of a frusto-conical portion 51a of the guide piece 51, only an outer sheath of compressed air, as indicated by the arrows, is required which flows along the outer surface of the guide piece 51 to prevent the developed arc from passing to the interface of the guide piece 40 upon stoppage of feed of wire, rod or strip of metal and functioning as the anode electrode of the system. It may be desirable to substitute some other relatively low cost gas in place of the compressed air fed to chamber 43 and in exiting through circumferentially spaced orifices 44 within the assembly of annular components 41, 42.

FIG. 4 illustrates a modification of the embodiment of FIG. 2 wherein two wires, 18 and 60 are fed simultaneously into the developed arc column 17 from opposite sides, in this case by separate powered feed rolls 19 for wire 18 and power feed rolls 61 for wire 60, as indicated by the arrows. Assuming that wire 17 remains the "ground" in the electrical system, wire 60 may either be a second "ground" or electrically insulated from the electrical circuit. The wires 17, 60 may be of the same material. Under these conditions, a substantial spray rate increase is achieved over that using a single wire 18. The wires 18, 60 may be of different material; i.e., using nickel and aluminum to lead to the exothermic connection forming nickel-aluminioe. The particles 29 developed thereby are accelerated towards the substrate (not shown). In the system similar to that of FIG. 2, the shield gas stream is of a combined nature including a secondary gas flowing along the internal surface of guide piece frusto-conical portion 40a while, the tertiary gas flows along the outside surface of the same guide piece portion.

Figure 5:
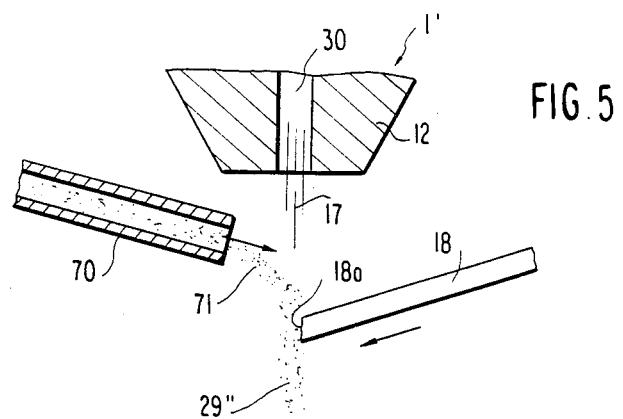
FIG. 5 is a vertical sectional view of a portion of a transferred plasma-arc torch forming a further embodiment of the invention.

In the embodiment of FIG. 5, a hybrid wire plus powder system is shown for the torch 1' which may or may not include, the double arcing prevention means of the embodiments of FIGS. 2, 3 and 4. In the embodiment of FIG. 5, the arc column 17 is developed between the cathode electrode (not shown) through a nozzle 30 of the cylindrical metal torch body 12 and the end of the metal wire or rod 18 fed toward the axis of nozzle 30 in the manner of the prior embodiments. The plasma forming gas, discharges through the nozzle 30, and the particles of metal which are formed from the metal wire or rod 18, as at 29", are accelerated and driven towards the substrate (not shown) positioned in the path of those heated, accelerated particles. In the hybrid wire plus powder system as shown, reacting materials may be used. Alternatively, the same materials may be used to create a novel coating or the particles from the wire 18 strike the workpiece (not shown) in their molten state while the other particles 71 introduced through a static fixed tube 70 are only heated to the heat-softened state. With the tube 70 positioned so that its discharge end is upstream of the end of wire 18, many of the powder particles 71 actually strike the molten face 18a of wire 18, at 72, to increase the likelihood of inter-alloying of the materials of particles 71 at wire 18.

Figure 6:
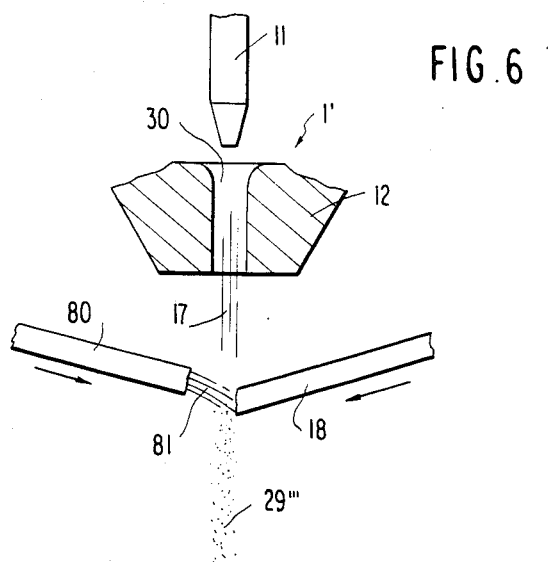
FIG. 6 is a vertical sectional view of a portion of a transferred plasma-arc torch forming yet a further embodiment of the present invention.

FIG. 6 is directed to a further embodiment of the invention, again being applicable to a transferred plasma-arc flame spray torch such as 1' of FIG. 3, although not necessarily to a spray torch having the double arcing prevention arc column guide assembly 29 of that figure. However, FIG. 6 illustrates such a torch where a secondary, low voltage arc is drawn between a pair of wires 18, 80 which move into the primary arc column 17. In this case, wire 80 constitutes a second cathode electrode to the primary electrode 11 which is in axial alignment with the nozzle 30 formed within the downstream end of the cylindrical metal body 12 of torch 1'. The wire 18 in such a system constitutes the anode electrode and may be "grounded". A second arc column 81 is set up between the opposed ends of wires 18, 80. Both arc columns 17, 81 terminate at the anode wire 18.

In contrasting the prior art system of FIG. 1A to that of FIG. 6, the system of FIG. 1A will spray 0.2 lb. per hour of steel per ampere of arc current at an operating voltage of 120 volts. That is a 400 ampere current which sprays 80 lbs. per hour of steel. In contrast, the addition of the second wires 60 in the embodiment of FIG. 4, raises the spray rate by a factor of about 50% to 120 lbs. per hour using the second wire 60 as second ground to that of wire 18, or maintaining it out of the electrical circuit. In the embodiment of FIG. 6 which employs its second wire 80 as a second cathode electrode, the adding of the secondary arc 81 increases the spray rate by 0.1 lb. per hour per ampere by a secondary arc. Thus, a secondary arc of 400 amperes raises the total spray rate to over 150 lbs. per hour. Other arrangements are possible utilizing three or more wires in which the additional wires are incorporated within the electrical circuit, and constitute a multiple supplemental cathodes.

In some cases, it may be desirable to use different gases in connection with the operation of the arc column guide 49. For example, a simple way to spray aluminum oxide is to contain alumina powder in the core of a thin enveloping coating of aluminum metal to form a composite wire. The arc melts or heat softens the alumina. The outer aluminum sheath, being electrically conductive, supports the arc. When the aluminum becomes a fine molten spray, a secondary flow of pure oxygen transforms most of the metal spray to alumina.

It has been additionally found that even higher spray rates are possible using strips of metal in place of the wire or rod as at 18, 60, 80 in FIGS. 2, 4, 6 respectively. Thin metal strips for a given feed rate of metal position a much larger surface area for heat transfer. Thus, the heated gas of the arc region 17 is much more effectively used with a greater rate of particle deposition and on the substrate, as developed at 29' FIG. 4, 29'' FIG. 5, 29''' of FIG. 6.

While several examples illustrative of preferred embodiments have been described, those skilled in the art will recognize that various changes in the disclosed structures and exemplary methods may be made without departing from the spirit and scope of this invention.

I claim:

1. In a flame spray method including feeding at least one wire or rod into the transferred arc column from a plasma torch body nozzle bore exit as an anode electrode to effect that transfer of the arc, the improvement comprising of the step of concentrically surrounding the arc column extending beyond the exit of the nozzle of the plasma torch body with a high velocity annular gaseous sheath to form an arc column guide thereby restricting the arc column within a region closely spaced radially from an axial extension of said nozzle, bore to prevent the arc column from penetrating the sheath of high velocity of gas, the high velocity annular gaseous sheath thereby causing the arc to self extinguish when the wire or rod is withdrawn from the region whose boundaries are defined by the high velocity annular gaseous sheath.

2. The method as claimed in claim 1, wherein said plasma torch comprises a thin-wall arc column guide tube spaced close to but radially outside of said arc column, and wherein said method includes passing a first gas flow along the inner surface of said tube and a second gas flow along the outer surface of the said tube, in the direction of the transferred arc emanating from the plasma torch nozzle.

3. The method as claimed in claim 2, further comprising the step of merging the inner and outer flows of gas at the end of the tube remote from the exit of the nozzle bore to constrict the arc column to a near axial path.

4. The method as claimed in claim 1, wherein said step of feeding at least one wire or rod into the transferred arc exiting from the plasma torch nozzle comprises feeding of at least two wires or rods into the region of the developed arc column.

5. The method as claimed in claim 1, wherein an electrical circuit is completed between a DC power source, the cathode and an anode electrode exterior of said plasma torch body, and wherein said method comprises using said at least one wire or rod to form the ground connection of the electrical circuit.

6. The method as claimed in claim 5, wherein said at least one wire or rod comprises at least two wires or rods, and said method comprises forming said ground connection of the electrical circuit through said two or more wire or rods.

7. The method as claimed in claim 5, further comprising the step of imposing a low voltage secondary arc between two of the wires or rods being fed into the arc region such that a primary transferred arc is initially set and then operating the primary transferred arc in parallel with the secondary arc.

8. The method as claimed in claim 1, for flame spraying a non-electrically conducting material of the class represented by alumina and said method comprises feeding a wire having a core comprised of said non-conducting material and having a thin outer sheath of conducting metal into said primary arc column.

9. The method as claimed in claim 2, wherein the step of passing a first gas flow along the inner surface of said tube comprises flowing pure oxygen capable of reacting with the molten particles produced from an outer sheath portion of the wire or rod to form an oxide metal.

10. The method as claimed in claim 2, wherein said arc column guide tube is electrically isolated from the body of the plasma torch within which said nozzle is formed, and said method comprises passing of a high velocity gas flow along the outer surface of said tube concentrically about said arc column emanating from the exit of said nozzle.

11. The method as claimed in claim 1, further comprising the step of flowing a powder to be sprayed into the arc column region axially beyond the exit of the plasma torch body nozzle and adjacent to, the end of said at least one wire or rod functioning to effect the transferred arc from the plasma torch body to said at least one wire or rod.

12. In a transferred arc plasma torch comprising a metal cylindrical torch body, one end of said cylindrical torch body being closed off by an insulating piece, a cathode electrode mounted to said cylindrical torch body within said insulating piece and extending axially within said cylindrical torch body, said metal cylindrical torch body having an end wall opposite said insulating piece including an axial bore forming a plasma torch nozzle, means for introducing plasma forming gas into the interior of the cylindrical metal torch body for passage through said nozzle, means for supporting and driving at least one wire or rod downstream of the exit of said nozzle of said plasma torch into the path of the plasma gas exiting from the nozzle, means for creating an electrical potential difference between said at least one wire or rod and said cathode electrode with said at least one wire or rod forming an anode electrode to cause a transferred arc to be set up through the nozzle to the end of said at least one wire or rod proximate to said nozzle, to form an arc column extending through said nozzle and axially beyond the nozzle exit, the improvement comprising means for forming a high velocity annular gaseous sheath concentrically about said arc column to thereby form an arc column guide and to restrict the arc column to within a region closely spaced radially from the axis of said nozzle bore, such that the arc column cannot penetrate said sheath, whereby the arc extinguishes itself under conditions where said at least one wire or rod is withdrawn from said region whose boundaries are defined by said high velocity annular gaseous sheath.

13. The transferred plasma-arc torch as claimed in claim 12, wherein said means for forming a high velocity annular gaseous sheath comprises a thin-wall tube arc column guide positioned concentrically to and radially outside of said arc column, means for passing a first gas flow along the inner surface of said tube, and means for passing a second gas flow along the outer surface of said tube.

14. The transferred plasma-arc torch as claimed in claim 13, wherein said means forming said inner and outer gas flows are such that said flows combine to constrict the arc column to a nearly axial path.

15. The transferred plasma-arc torch as claimed in claim 14, wherein said inner and outer gas flows are of different gas types.

16. The transferred plasma-arc torch as claimed in claim 12, wherein said means for feeding at least one wire or rod into the arc column extending axially beyond the nozzle exit comprises means for feeding at least two wires or rods into said extended arc column.

17. The transferred plasma-arc torch as claimed in claim 16, wherein one of said wires forms a ground connection of the electrical circuit between the electrical power source, and said cathode electrode.

18. The transferred plasma-arc torch as claimed in claim 16, wherein at least two of said wires or rods form a ground connection of the electrical circuit.

19. The transferred plasma-arc torch as claimed in claim 17, further comprising means for creating a low voltage secondary arc between said at least two wires or rods fed into the extended arc region and for operating the primary transferred arc in parallel with said secondary arc.

20. The transferred plasma-arc torch as claimed in claim 12, wherein said at least one wire or rod comprises a core of non-conducting material in a thin outer sheath of conducting metal whereby a non-electrically conducting material such as aluminum is sprayed.

21. The transferred plasma-arc torch as claimed in claim 20, wherein the outer conducting sheath is the unoxidized metal of the oxide powder contained in the core.

22. The transferred plasma-arc torch as claimed in claim 13, wherein said gas flow along the inner surface of said arc column guide tube is a flow of pure oxygen which reacts with the molten particles produced from the outer sheath portion of at least one wire or rod to form an oxide of that metal.

23. The transferred plasma-arc torch as claimed in claim 13, wherein said means for forming a high velocity annular gaseous sheath comprises an arc column guide tube electrically insulated from the body of the plasma torch forming said torch nozzle, and said means for forming a high velocity annular gaseous sheath further includes means for passing a high velocity gas flow along the outer surface of said tube.

24. The transferred plasma-arc torch as claimed in claim 12, further comprising means for flowing powder to be sprayed into said extended arc column against the end of said at least one wire or rod being fed into the region of said extended arc column.

* * * * *